United States Patent [19]
Becker et al.

[11] Patent Number: 5,947,662
[45] Date of Patent: Sep. 7, 1999

[54] SYSTEM FOR HOLDING A THIN-WALLED WORKPIECE DURING MACHINING

[75] Inventors: Manfred G. Becker, Novi; Peter C. Dinardi, Livonia; Kenneth J. Sprenger, Lake Orion; Timothy S. Guitar, Clinton Township, all of Mich.

[73] Assignee: Ernst Thielenhaus KG, Wuppertal, Germany

[21] Appl. No.: 09/127,432

[22] Filed: Jul. 31, 1998

Related U.S. Application Data

[62] Division of application No. 08/794,735, Feb. 3, 1997, Pat. No. 5,826,866.

[51] Int. Cl.⁶ .................................................. B23C 9/00
[52] U.S. Cl. ............................... 409/131; 29/559; 269/7
[58] Field of Search .......................... 408/1 R; 409/131, 409/132; 451/259, 460; 269/7, 56; 29/559

[56] References Cited

U.S. PATENT DOCUMENTS

| | | | |
|---|---|---|---|
| 3,790,152 | 2/1974 | Parsons | 269/7 |
| 3,897,535 | 7/1975 | Lapac et al. | 269/7 |
| 3,949,977 | 4/1976 | Wustrau | 269/56 |
| 3,953,013 | 4/1976 | Griffith et al. | 269/7 |
| 4,509,673 | 4/1985 | Schmidt et al. | 269/7 |
| 4,629,378 | 12/1986 | Parsons | 409/131 |
| 4,730,382 | 3/1988 | Parsons | 269/7 |
| 5,079,821 | 1/1992 | Parsons | 29/424 |
| 5,127,780 | 7/1992 | Massa | 409/234 |

*Primary Examiner*—Daniel W. Howell
*Assistant Examiner*—Christopher Kirkman
*Attorney, Agent, or Firm*—Herbert Dubno

[57] ABSTRACT

Each of a plurality of thin-walled workpieces is held for machining in a machine in a respective rigid holder. Ends of unmachined workpieces are each first imbedded in a molten body of a metal alloy having a melting point between 45° C. and 140° C. contained in a respective one of the rigid holders in a cooling station and having a negative expansion coefficient. The holder and the alloy body are cooled in the cooling station to solidify the body around the imbedded end of the unmachined workpiece and the cooled holder is displaced with the unmachined workpiece from the cooling station into the machine. After machining of the workpiece in the holder, the holder is displaced from the machine into a heating station where it is heated to melt the alloy body. Then the machined workpiece is lifted out of the molten body in the heating station and the holder with the molten alloy body is recirculated from the heating station to the cooling station. Then another workpiece is imbedded in the molten alloy body and the cycle is repeated.

8 Claims, 2 Drawing Sheets

SYSTEM FOR HOLDING A THIN-WALLED WORKPIECE DURING MACHINING

CROSS REFERENCE TO RELATED APPLICATION

This application is a division of Ser. No. 08/794,735 filed, Feb. 3, 1997, now U.S. Pat. No. 5,826,866 of Oct. 27, 1998.

FIELD OF THE INVENTION

The present invention relates to the machining of a thin-walled and flexible workpiece. More particularly this invention concerns a chucking device for holding such a workpiece while it is machined.

BACKGROUND OF THE INVENTION

The production of various thin-walled tubes and sleeves requires that the normally cast workpiece be held accurately while its surfaces are ground or even superfinished, in particular the end faces of bushings. Such workpieces, in addition to being fairly flexible, also often have complexly shaped outside surfaces, as for instance when used as seals or bearing parts, presenting another obstacle to gripping them.

The problem is that the holder or chuck should not deform the workpieces, while at the same time it should hold them so solidly that they do not move inappropriately while being machined. This is particularly difficult with such workpieces when their outside surfaces are irregular and often unfinished as a result of the casting. Obviously these problems are all compounded by the fact that the items in question are mass produced in large volume, but must still conform to relatively tight tolerances.

OBJECTS OF THE INVENTION

It is therefore an object of the present invention to provide an improved method of and apparatus for holding a thin-walled flexible workpiece while it is being machined.

Another object is the provision of such an improved method of and apparatus for holding a thin-walled flexible workpiece while it is being machined which overcomes the above-given disadvantages, that is which can grip a workpiece of virtually any shape and hold it solidly without, however, deforming it.

SUMMARY OF THE INVENTION

Each of a plurality of thin-walled workpieces is held for machining in a machine in a respective rigid holder. Ends of unmachined workpieces are each first imbedded in a molten body of a metal alloy having a melting point between 45° C. and 140° C. contained in a respective one of the rigid holders in a cooling station and having a negative expansion coefficient. The holder and the alloy body are cooled in the cooling station to solidify the body around the imbedded end of the unmachined workpiece and the cooled holder is displaced with the unmachined workpiece from the cooling station into the machine. After machining of the workpiece in the holder, the holder is displaced from the machine into a heating station where it is heated to melt the alloy body. Then the machined workpiece is lifted out of the molten body in the heating station and the holder with the molten alloy body is recirculated from the heating station to the cooling station. Then another workpiece is imbedded in the molten alloy body and the cycle is repeated.

According to the invention the alloy body is a bismuth alloy. It can be lead free and contain tin and indium. The advantage of such a bismuth alloy is that it has a negative expansion coefficient, that is its volume increases somewhat as it moves from the liquid to the solid state. Thus as the alloy solidifies it solidly fills around the workpiece end imbedded in it and secures it solidly in the holder. Wood's metal (8 parts Bi, 4 parts Pb, 2 parts Sn, 1–2 parts Cd) with a melting point of 70° C. and Lipowitz's metal (15 parts Bi, 8 parts Pb, 4 parts Sn, 3 parts Cd) with a melting point of 60° C., or Rose's metal (2 parts Bi, 1 part Sn, 1 part Pb) with a melting point of 94° C. can be used.

For workpieces that might be applied to medical use, that is which must be maintained perfectly free of impurities, it is advantageous to overlie the alloy body with a heat-resistant flexible foil prior to imbedding the workpiece end therein so that direct contact between the alloy body and the workpiece is prevented by the foil.

Normally according to the invention a plurality of such holders are circulated in a basically annular path passing through the stations and machine.

The workpiece and alloy body according to the invention are both annular.

The apparatus for carrying out the method of this invention comprises a plurality of the holders each containing a body of a metal having a melting point between 45° C. and 140° C., a station provided with a heater for heating each of the holders to melt the respective bodies, and a station having a cooler for cooling the holders to solidify the respective bodies of metal. An input feeder imbeds an end of an unmachined workpiece in the molten body of metal of a one of the holders in the cooling station prior to solidification of the molten body so that when the molten body solidifies it solidly captures the unmachined workpiece imbedded therein. A transporter conveys the holders one after the other from the cooling station into the machine where the respective imbedded workpieces are machined and thence from the machine to the heating station. An output feeder lifts the machined workpieces one after the other out of the respective molten bodies in the heating station after melting of the respective bodies in the respective holders therein. Another transporter recirculates the holders with the respective molten metal bodies one at a time from the heating station to the cooling station.

The second transporter includes a carousel having a plurality of grippers movable through the stations. The feeders include respective manipulator arms having gripper ends engageable with the workpieces in the respective stations.

Each holder according to the invention comprises an upwardly open vessel of a shape generally similar to a shape of the workpieces. The workpieces and holders are annular and each holder is upwardly C-shaped with a lower ribbed surface. Furthermore each holder is provided with an external steel reinforcing ring.

The heater includes a seat into which the holders can fit and a heating element underneath the seat. The cooler according to the invention includes an upwardly open vessel provided with a seat into which the holders can fit, and means for circulating cold water around a one of the holders engaged in the seat.

More particularly in accordance with the invention a preheating station is provided between the heating station and an output side of the machine with a heater for the holders and a postcooling station is provided between the cooling station and an input side of the machine with a cooler for the holders. The stations lie on a circular path and the second feeder has a carousel-type gripper movable through the stations.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
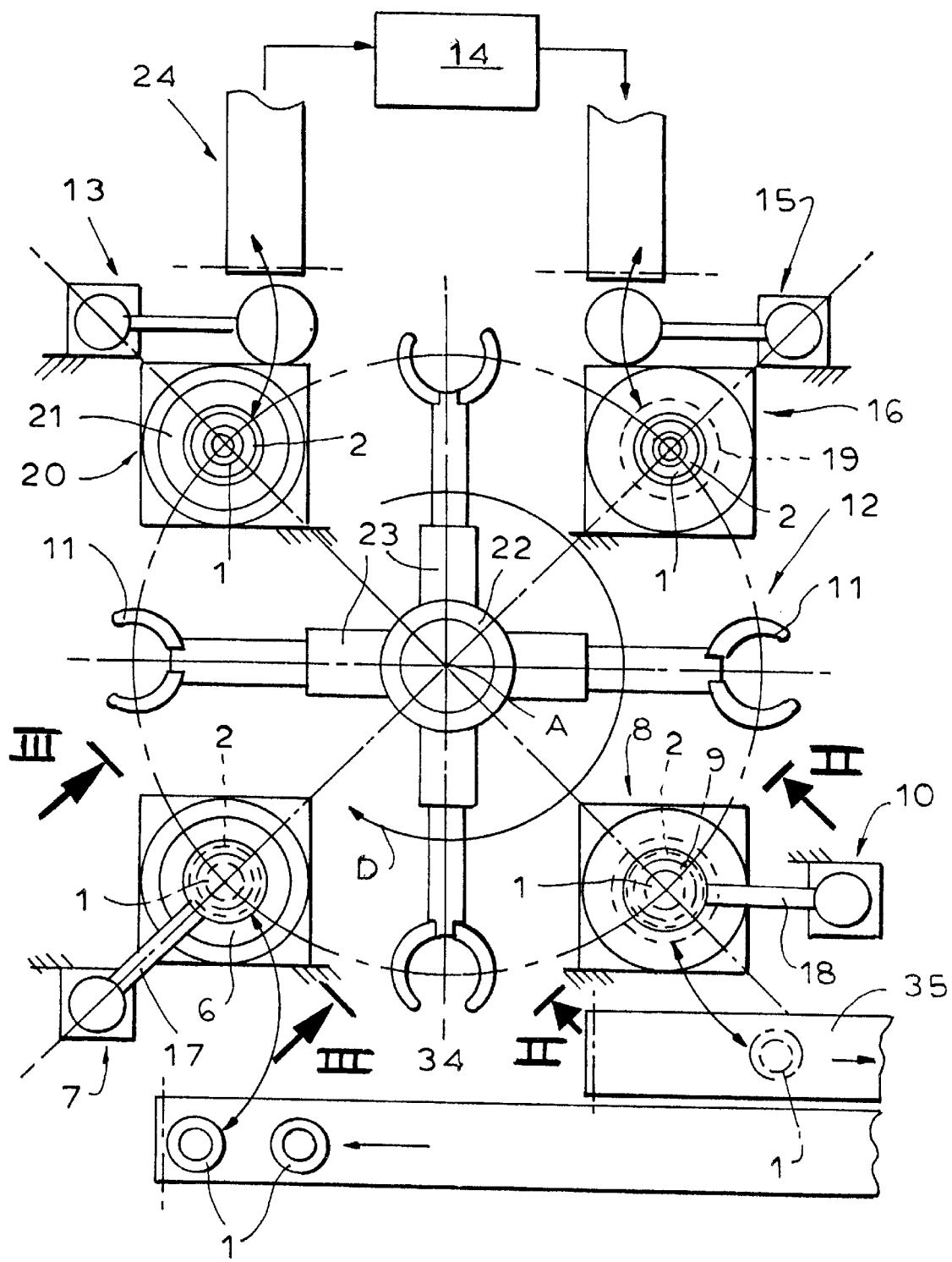
FIG. 1 is a largely diagrammatic top view of the apparatus for carrying out the method of this invention.

As seen in the drawing, a succession of workpieces 1 are each formed as metal rings or sleeves centered on respective axes and of L-section. For machining ends 1a of the workpieces 1 are set in respective annular cup-shaped holders 3 each holding a body 4 of a metal that melts at between 45° C. and 140° C. These holders 3 are constructed to fit with unillustrated conveyor seats and holders in a standard machine 14 where upper ends 1b of the workpieces 1 are machined.

The holders 2 with their,respective workpieces 1 are circulated along a path P mostly centered on an axis A in a direction D by a transporter 12 having a center hub 22 from which extend telescoping arms 23 having at their ends grippers 11 that can engage around the holders 2. The path P starts at a cooling station 5 provided with a cooler 6, then goes through a post cooling station 20 with another such cooler 21. Then the holders 2 and workpieces 1 are moved through the machine 14 and thereafter are redeposited on the main path P at a preheating station 16 having a heater 19, whence they move to a heating station 8 having a heater 9 where they are stripped of their workpieces 1 before being returned to the cooling station 5.

A first manipulator or feeder 7 having a gripper arm 17 moves the rings 1 from the input conveyor 34 to the station 5. Another such manipulator or feeder 13 picks the holders 2 with their workpieces 1 from the station 20 into an intake station 24 of the machine 14, and another such manipulator or feeder 15 moves them from the output of the machine 14 to the preheating station 16. A final such conveyor 10 having a robot arm 18 picks the machined workpieces 1 out of the holders 2 at the station 8 and deposits them in an output conveyor 35. The holders 2 are moved from the station 16 to the station 18, from the station 18 to the station 5, and from the station 5 to the station 20 by the carousel transport device 12.

Figure 2:
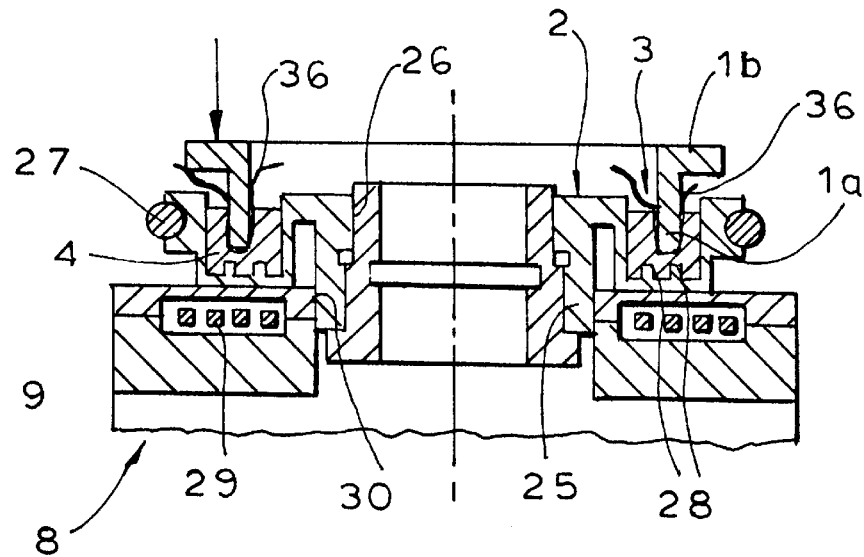
FIGS. 2 and 3 are large-scale vertical sections taken along respective lines II—II and III—III of FIG. 1.
Figure 3:
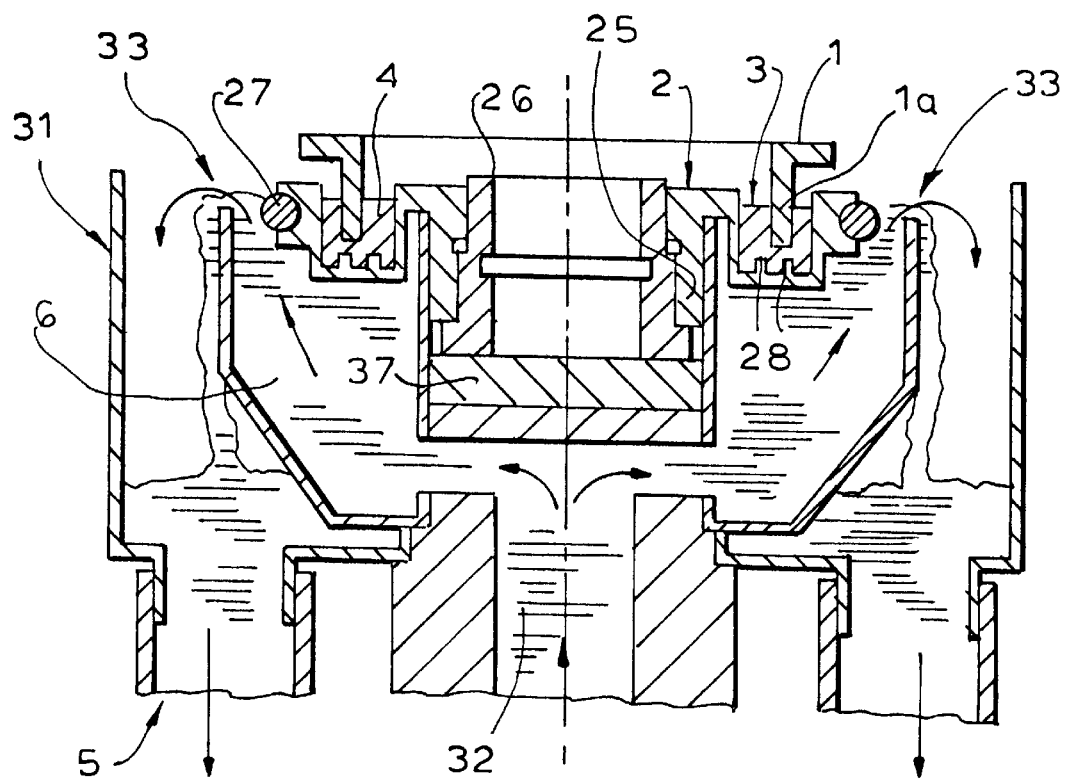

As shown in FIG. 2 the holders 2 are each shaped as a highly conductive, here aluminum, ring of upwardly open annular shape, having an inner hub 25 fitting in a seat 30 of the heater and having a center sleeve 26 adapted to fit as is known in the art with holders of the machine 14. A steel ring 27 surrounds and reinforces the outside of the holder 2 so that it does not spread significantly when heated. The alloy body 4 is normally a bismuth alloy, for instance a Wood's metal comprised of 7 to 8 parts lead, 4 parts bismuth, 2 parts tin, and 1 to 2 parts cadmium with a melting point of about 70° C. Alternately a lead-free bismuth alloy with bismuth, tin, and indium can be used.

FIG. 2 also shows how the heater 8 is provided with a heating coil 29 that is juxtaposed with a ribbed underside 28 of the holder 2 engaged in its seat 30. Thus the heater 8 can melt the alloy body 4 relatively rapidly. In addition a foil 36 can be provided to prevent direct contact between the alloy body 4 and the workpiece 1.

The cooling device 5 is formed as an upwardly open vessel 31 having a cold water inlet 32 and a warm-water overflow-type outlet 33. The holder 2, including the sleeve 26, is set in the vessel 31 in a holder 36 and water is flowed up around it to cool it and the metal 4 therein.

The apparatus described above operates as follows:

A holder 2 containing a mass 4 of metal in molten condition is displaced by the transporter 12 from the heating station to the cooling station 5 where it is set in the cooler 6. As soon as it is in position in the station 5, the conveyor or manipulator 7 lifts an unmachined workpiece 1 out of the input conveyor 34 and deposits it in the holder 2, with the lower end 1a that needs no machining set in the molten metal mass 4. The cooling quickly hardens this mass 4 around the ring 1 with no local deformation of it so that, in effect, the workpiece 1 becomes integral with the holder 2.

The transporter 12 them moves the precooled assembly 1, 2 from the station 5 to the station 20 where it is cooled further. Then the manipulator 13 picks the solidly interconnected workpiece 1 and holder 2 out of the station 20 and hands it off to the intake station 24 of the machine 14 where its end 1b is accurately ground, superfinished, or otherwise machined.

The manipulator 15 picks the machined workpiece 1 still in its holder 2 out of the output end of the machine 14 and deposits it in the preheating station 16 where it is warmed. The transporter 12 then picks the prewarmed holder 2 and workpiece 1, still always only touching or handling the holder 2, from the prewarming station to the heating station 8 where the metal 4 is completely melted. The manipulator 18 picks the machined workpiece 1 out of the molten metal 4 of the holder 2 and deposits it in the output conveyor 35.

Finally the transporter 1 moves the empty holder 2 holding the molten metal mass 2 from the heating station 8 to the cooling station 5 where it is fitted with another unmachined workpiece 1 and the cycle is restarted. With each indexing through 90° three holders 2 are advanced to the next station. The transporter 12 only moves empty between the stations 20 and 16.

We claim:

1. A method of holding thin-walled workpieces for machining in a machine, the method comprising the steps of:
    a) imbedding an end of an unmachined workpiece in a molten body of a metal alloy having a melting point between 45° C. and 140° C., contained in a rigid holder in a cooling station, and having a negative expansion coefficient;
    b) cooling the holder and the alloy body in the cooling station to solidify the body around the imbedded end of the unmachined workpiece, whereby on solidifying the body expands and locks the workpiece in the holder;
    c) displacing the cooled holder with the unmachined workpiece from the cooling station into the machine;
    d) after machining of the workpiece in the holder, displacing the holder from the machine into a heating station;
    e) heating the holder and alloy body in the heating station to melt the alloy body;
    f) lifting the machined workpiece out of the molten body in the heating station;
    g) recirculating the holder with the molten alloy body from the heating station to the cooling station, imbedding another such thin-walled workpiece in the molten alloy body, and repeating steps b) through f) with the other workpiece; and
    h) overlying the alloy body with a heat-resistant flexible foil prior to imbedding the workpiece end therein, whereby direct contact between the alloy body and the workpiece is prevented by the foil.

2. The holding method defined in claim 1 wherein the alloy body is a bismuth alloy.

3. The holding method defined in claim 2 wherein the bismuth alloy is lead free and contains tin and indium.

4. The holding method defined in claim 1 wherein the workpiece and alloy body are both annular.

5. A method of holding thin-walled workpieces for machining in a machine, the method comprising the steps of:

a) imbedding an end of an unmachined workpiece in a molten body of a metal alloy having a melting point between 45° C. and 140° C., contained in a rigid holder in a cooling station, and having a negative expansion coefficient;

b) cooling the holder and the alloy body in the cooling station to solidify the body around the imbedded end of the unmachined workpiece, whereby on solidifying the body expands and locks the workpiece in the holder;

c) displacing the cooled holder with the unmachined workpiece from the cooling station into the machine;

d) after machining of the workpiece in the holder, displacing the holder from the machine into a heating station;

e) heating the holder and alloy body in the heating station to melt the alloy body;

f) lifting the machined workpiece out of the molten body in the heating station; and g) recirculating the holder with the molten alloy body from the heating station to the cooling station, imbedding another such thin-walled workpiece in the molten alloy body, and repeating steps b) through f) with the other workpiece, a plurality of such holders being circulated in a basically annular path passing through the stations and machine.

6. The holding method defined in claim 5 wherein the alloy body is a bismuth alloy.

7. The holding method defined in claim 6 wherein the bismuth alloy is lead free and contains tin and indium.

8. The holding method defined in claim 5 wherein the workpiece and alloy body are both annular.

* * * * *